United States Patent Office 3,297,682
Patented Jan. 10, 1967

3,297,682
TRIFLUOROMETHYLDINITROPHENYL-
AZIRIDINES
Stephen J. Kuhn, Sarnia, Ontario, Canada, assignor to The
Dow Chemical Company, Midland, Mich., a corporation of Michigan
No Drawing. Filed Dec. 4, 1964, Ser. No. 416,157
4 Claims. (Cl. 260—239)

This invention relates to new chemical compounds which are useful for their biological activities. These new compounds have the general formula

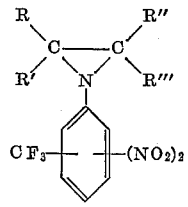

where R, R' R", and R''' are each selected from the group consisting of hydrogen, methyl, and ethyl.

Compounds of this class are conveniently prepared by the reaction of a (trifluoromethyl)dinitrophenyl halide with a lower alkylene imine in the presence of an acid-binding agent, such as a tertiary aliphatic amine. Preferably, the reaction is carried out in an inert solvent, such as benzene, cyclohexane, or ether at a temperature below about 30° C. in order to avoid polymerization of the reactive aziridine ring. Either reactant may be used in excess, but equal molar proportions are usually desirable for practical reasons. Best results are obtained in this reaction when at least one of the nitro groups in the phenyl halide reactant is ortho or para to the aromatic halogen atom which is replaced.

An alternate but similar preparation involves the reaction of the alkylene imine with a (trifluoromethyl)dinitroanisole where the methoxy group in the anisole is displaced and there is elimination of methyl alcohol as described by Bestian, Ann. Chem. 566, 232 (1950).

Example 1.—A solution of 0.2 g. mole of 4-chloro-α,α,α-trifluoro-3,5-dinitrotoluene in 50 ml. of ether was added dropwise to an ether solution of 0.2 g. mole of ethylenimine and 0.21 g. mole of triethylamine at about 10° C. The precipitate thereby obtained was separated, washed with water to remove triethylamine hydrochloride, and recrystallized from an alcohol-acetone mixture to obtain a near quantitative yield of yellow, crystalline 1-(α,α,α-trifluoro-2,6-dinitro-p-tolyl)aziridine, M.P. 175° C. The identity of the product was confirmed by elemental analysis and by spectroscopic examination.

Example 2.—According to the procedure of Example 1, propylenimine was reacted with a molar equivalent of 4-chloro-α,α,α-trifluoro-3,5-dinitrotoluene to obtain 1-(α,α,α-trifluoro-2,6-dinitro-p-tolyl)-2-methylaziridine, a yellow crystalline solid melting at 120° C.

By a procedure such as described above, other trifluoromethyldinitrophenylaziridines are prepared as yellow crystalline solids of moderate melting point. For example, 2-bromo-α,α,α-trifluoro-3,5-dinitrotoluene is reacted with ethylenimine to produce 1-(α,α,α-trifluoro-4,6-dinitro-o-tolyl)aziridine, 4-chloro-α,α,α-trifluoro-3,5-dinitrotoluene is reacted with 2,2-dimethylaziridine to make 1 - (α,α,α - trifluoro - 2,6 - dinitro - p - tolyl) - 2,2 - dimethylaziridine, 2 - chloro - α,α,α - trifluoro - 3,5 - dinitrotoluene is reacted with 2-ethylaziridine to form 2-ethyl - 1 - (α,α,α - trifluoro - 4,6 - dinitro - o - tolyl)-aziridine, 5-bromo-α,α,α-trifluoro-2,4-dinitrotoluene is reacted with 2,2,3,3-tetramethylaziridine to obtain 1-(α,α,α-trifluoro - 4,6 - dinitro - m - tolyl) - 2,2,3,3 - tetramethylaziridine, and 2-bromo-α,α,α-trifluoro-3,5-dinitrotoluene is reacted with 2,3-dimethylaziridine to produce 1-(α,α,α-trifluoro - 4,6 - dinitro - o - tolyl) - 2,3 - dimethylaziridine. These products are obtained in good yields and have chemical and physical properties similar to those of the compounds of Examples 1 and 2.

These compounds are of value for their biological activities. Nematodes such as pinworms or ascarid worms are effectively controlled by feeding infected animals diets containing about 0.05% by weight of a compound of the class described. Even smaller concentrations in an aqueous drench are effective against soil nematodes. Similar concentrations in aqueous dispersions are actively fungicidal when applied to certain plant mildews and such dispersions are also contact miticides.

I claim:
1. A compound of the formula

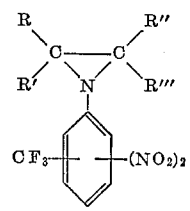

wherein R, R', R", and R''' are each selected from the group consisting of hydrogen, methyl, and ethyl.
2. The compound of claim 1 wherein R, R', R", and R''' are hydrogen atoms.
3. 1-(α,α,α-trifluoro-2,6-dinitro-p-tolyl)aziridine.
4. 1 - (α,α,α - trifluoro - 2,6 - dinitro - p - tolyl) - 2-methylaziridine.

No references cited.

ALEX MAZEL, Primary Examiner.
ALTON D. ROLLINS, Assistant Examiner.